United States Patent [19]

Bridgnell et al.

[11] 4,216,937
[45] Aug. 12, 1980

[54] HEAT EXCHANGER MOUNTING DEVICE

[75] Inventors: David G. Bridgnell, Rolling Hills; Frederick W. Jacobsen, Los Angeles, both of Calif.

[73] Assignee: The Garrett Corporation, Los Angeles, Calif.

[21] Appl. No.: 597,049

[22] Filed: Jul. 18, 1975

Related U.S. Application Data

[62] Division of Ser. No. 447,906, Mar. 4, 1974.

[51] Int. Cl.² ........................ F28F 7/00; F16F 15/04
[52] U.S. Cl. ................................ 248/562; 165/69; 248/DIG. 1
[58] Field of Search ............... 248/358 AA, 15, 18, 248/20, 21, DIG. 1; 165/69, 162

[56] References Cited

U.S. PATENT DOCUMENTS

| 1,840,417 | 1/1932 | Seelert | 248/232 X |
| 2,503,595 | 4/1950 | Preston | 165/162 X |
| 2,668,692 | 2/1954 | Hammell | 165/69 X |
| 2,752,128 | 6/1956 | Dedo | 165/162 X |
| 2,778,629 | 1/1957 | Johnson | 248/358 AA X |
| 3,129,836 | 4/1964 | Frevel | 248/358 AA X |
| 3,448,949 | 6/1969 | Kelley | 248/22 X |

FOREIGN PATENT DOCUMENTS 883678 7/1953 Fed. Rep. of Germany ........... 248/232

*Primary Examiner*—J. Franklin Foss
*Attorney, Agent, or Firm*—Henry Bissell; Joel D. Talcott; Albert J. Miller

[57] ABSTRACT

A device for floatably supporting a portion of a heat exchanger core to a shell for accommodating thermal expansion while damping oscillatory movement of the core.

10 Claims, 4 Drawing Figures

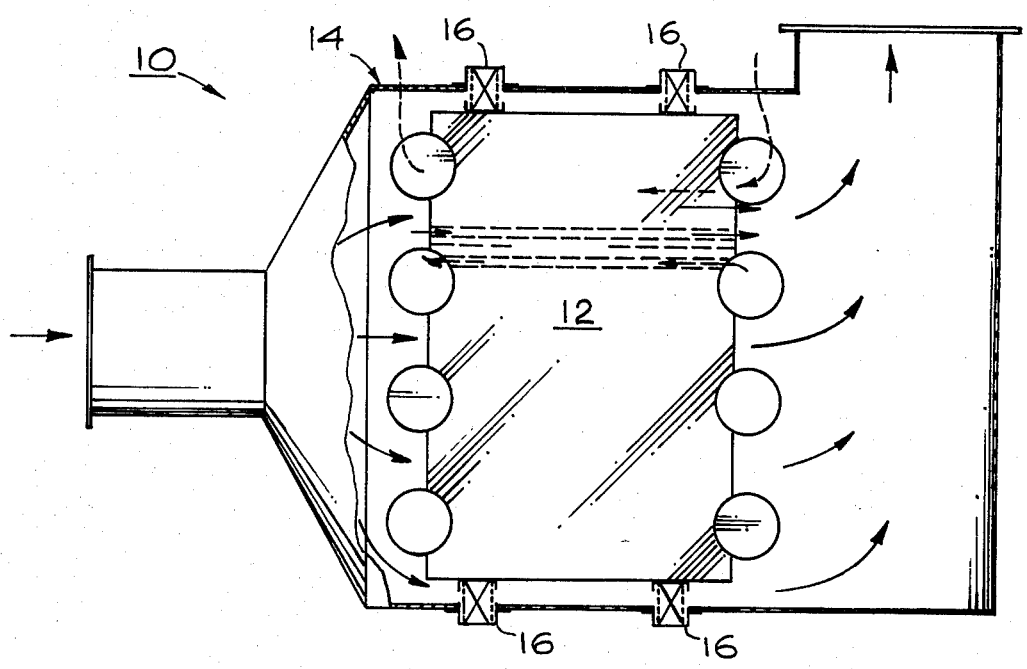
Fig. 1
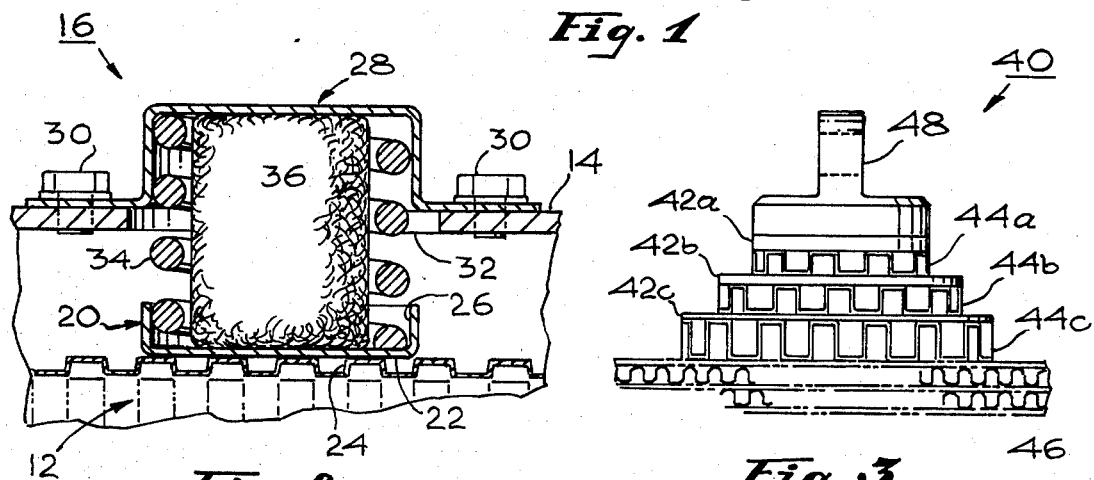
Fig. 2
Fig. 3
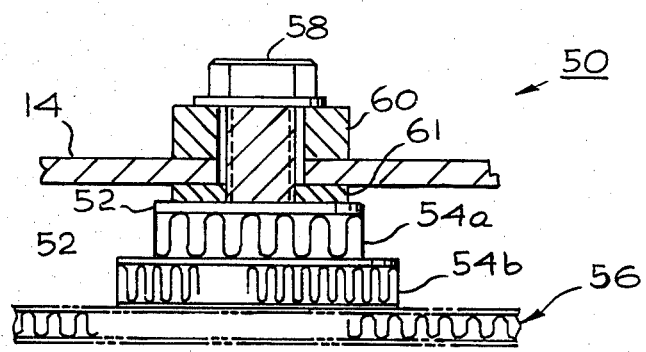
Fig. 4

HEAT EXCHANGER MOUNTING DEVICE

This is a divisional of application Ser. No. 447,906 filed Mar. 4, 1974.

BACKGROUND OF THE INVENTION

1. Field of the Invention

This invention relates to devices for mounting a central member in floating configuration within an exterior structure and, more particularly, to arrangements for mounting a heat exchanger core within a structural shell.

2. Description of the Prior Art

The core matrix of a heat exchanger for industrial turbine applications is subjected to extreme thermal stresses caused by temperature differentials in the fluids passing through the heat exchanger. Additional stresses from shock and vibration may seriously affect the life of the heat exchanger. Various arrangements of the prior art are known for supporting heat exchanger devices while accommodating variations in dimension due to thermal expansion. The Kovalik U.S. Pat. No. 3,294,159 discloses a plurality of spring biased support assemblies for mounting a tube-type heat exchanger within a shell. However, such mounting arrangements as are known do not provide the desired damping of vibrational oscillations or the protection against inertial loading, both of which are considered essential in vehicle mounted heat exchanger arrangements.

Any mounting system for the heat exchanger core must be capable of reacting to inertial loading in any direction and yet allow essentially unrestrained thermal expansion of the core with respect to the housing. The mount must distribute the mount point loads into the core without requiring relatively thick local structure adjacent to the core which would give rise to large transient thermal stresses, and without producing unacceptable load concentrations. The capability of preloading the mounts is desirable to assure proper contact between the mounts and core under conditions of shock, vibration and thermal growth. The natural frequency of the unit on its mount may be a problem if it is within the engine excitation frequency ranges. Snubbing and damping are also needed to resist shock loads without excessive movement and to rapidly damp out vibrations.

Accordingly, a major object of the present invention is to provide a device for floatably mounting the core matrix of a heat exchanger to a shell by means which accommodate the variations in dimension due to thermal expansion while also protecting against vibration from the associated turbine unit and protecting against variable loads and shock.

SUMMARY OF THE INVENTION

In brief, arrangements in accordance with the present invention comprise individual mounting devices incorporating fine dimensional structure which accommodate thermal expansion while serving to distribute the mounting point loads into the core without requiring relatively thick structural elements adjacent the core, thus providing compatibility with the core structure and avoiding large thermal stresses and unacceptable load concentrations. The mounts are pre-loaded in order to assure proper support under conditions of shock, vibration and thermal growth. The fine structure employed in devices in accordance with the present invention serves to rapidly damp any mechanical vibrations and resist shock loads without excessive movement.

In one particular arrangement in accordance with the present invention, an elastic body comprising a small billet of a woven wire matrix, which may be knit from fine wire such as Inconel, stainless steel or Super Alloy, is folded into a compressed mass and mounted as the central support element within a spiral spring, both pad and spring being compressed under preloading when the device is fixed in place by securing one end to the shell and bearing against the heat exchanger core to support the same relative to the shell. The central matrix pad serves to damp vibrations of the natural resonance of the associated turbine (400–500 Hz) while also assisting in absorbing and protecting against transient shock loads. Both the woven pad and the compressed spiral spring serve to accommodate dimensional variations of the heat exchanger core resulting from operation over the extremes of temperature encountered in use. The pad and spring are enclosed between opposed cups of relatively thin sheet metal, the inner cup serving to bear against the core while the outer cup is secured to the shell by bolts or other suitable fastenings.

In an alternative arrangement in accordance with the present invention, a series of layers of fine structure, separated from each other but joined together by transverse sheet members of varying thickness and lateral dimension, serve to provide the desire accommodation of variation in core dimension from thermal expansion. In such arrangements one end of the mount is fastened to the heat exchanger core, as by welding or brazing, while the other end is bolted to a lug fastened to the shell. The fine structure may comprise metal honeycomb of fine dimension in one configuration. In accordance with another aspect of the invention, the fine structure may comprise finned elements of the type utilized in the core itself as the separating structural elements within the respective fluid layers between the layer separating plates. Such mounting structure is preferably square or rectangular in outline and terraced in proceeding from layer to layer from one end to the other, with the gauge and density of the honeycomb material being varied in different portions of the mount. Alternatively, it may be of circular or other rounded outline if desired.

BRIEF DESCRIPTION OF THE DRAWING

A better understanding of the present invention may be had from a consideration of the following detailed description, taken in conjunction with the accompanying drawing, in which:

FIG. 1 is a generalized representation, partially broken away, of a heat exchanger core mounting arrangement in accordance with the present invention;

FIG. 2 is a sectional view of a particular mounting device for use in the arrangement of FIG. 1;

FIG. 3 is a sectional view of an alternative mounting device for use in the arrangement of FIG. 1; and FIG. 4 is a section view of a variation of the mounting device of FIG. 3.

DESCRIPTION OF THE PREFERRED EMBODIMENT

While the devices of the present invention are particularly adapted for use in a heat exchanger to floatably mount the core of the heat exchanger to a shell in the engine compartment of a moving vehicle and the manner of this operation is described in the preferred embodiment, it is to be understood that the device is readily adaptable to other applications. The heat exchanger illustrated in the preferred embodiment is intended to be representative of a variety of heat exchangers, each of which may have a core matrix subject to thermal stress from expansion and contraction of the core caused by thermal cycling of the heat exchanger in use and also subject to oscillatory movement in the shell caused by engine vibration and vehicle shock.

In FIG. 1 there is illustrated a heat exchanger shown generally at 10 and having a core matrix 12 which is floatably supported to a shell 14 by mounting devices 16 in accordance with a preferred embodiment of the present invention. The shell 14 as illustrated, for example, is a box-like container in the engine compartment of the moving vehicle with suitable open ends for receiving the flow of one fluid through one end in the heat exchanging relationship with another fluid in the core matrix 12 in typical heat exchanger operation. The core matrix 12 is floatably supported in the shell 14 for lateral movement with respect to the heat exchanger axis by the mounting devices 16 of the invention.

In FIG. 2 there is shown a preferred embodiment-one of the mounting devices 16 of FIG. 1 in an enlarged sectional view in which a cup 20 has its bottom end 22 fitting against a core edge 24. The peripheral sides 26 of the cup 20 form the cup inner portion. A second cup portion 28 is fastened to the shell 14 on the outside thereof by bolts 30. The resilient portion of the mount 16 extends between the cups 20, 28 through an opening 32 in the shell 14 and comprises a spring 34 encircling a woven matrix pad 36. The inner diameters of the cups 20 and 28 are preferably the same with the facing portions defining a cylindrically shaped space for seating the compressed spring 34 and pad 36. The wire matrix pad 36 is preferably cylindrically shaped and made up of loosely put together, highly thermal conductive metal such as copper or steel mesh to accommodate the thermal expansion of the core matrix.

A major aspect of the invention is the manner in which thermal stresses due to the rapidly changing temperatures in the core are maintained at a minimum. The thickness of the plate of the cup 20 is comparable to the core material 24 in order to avoid significant differences in thermal gradients between the thin plate in the core 12 and the structure of the mounting device and the thermal stresses attendant therewith. Preferably the thickness of the plate of the cup 16 corresponds to the thickness of the plate and fin material in the heat exchanger core 12.

The extension of the mount 16 through the shell 14 contributes to the compactness of the structure without requiring additional size for the shell 14 fitting around the core matrix. In this manner the advantage of having a larger space available for the compression springs and wire matrix is accomplished without the disadvantage of increasing the size of the shell.

Referring now to FIG. 3, there is shown a second embodiment of the invention in the form of a mount 40 comprised of a series of layers or sandwich of sheets 42 of varying thickness interspersed with fine honeycomb structure layers 44. The outermost sheet 42a is the thickest of the set and the other sheets become progressively thinner in accordance with their proximity to the core 46. The mount 40 is constructed with a terraced effect or shape such that the outer sheet 42a and adjacent honeycomb layer 44a have a lesser lateral dimension than the adjacent sheet 42b and layer 44b, which in turn have a lesser lateral dimension than the innermost sheet 42c and honeycomb layer 44c. The inner honeycomb layer 44c is adjacent the core 46 and secured thereto by welding or brazing. The remainder of the assembly of the mount 40 is also fastened together, as by brazing. The outermost portion of the mount 40 comprises a fastening 48 with means for securing the mount 40 to the adjacent portion of the shell 14 (FIG. 1).

Still another arrangement in accordance with the present invention is depicted in FIG. 4 which shows a mount 50 comprising successive sheets 52 interspersed with successive finned layers 54. As in the embodiment of FIG. 3, layers 52 become progressively thinner in accordance with their proximity to the core 56 while both the sheets 52 and finned layers 54 become progressively larger in lateral dimension in accordance with their proximity to the core 56. Moreover, the inner layer 54b is of finer finned structure than the outer layer 54A. The outer fastening portion of the mount 50 comprises a bolt and nut 58 centrally secured to the sheet and layer portions 52, 54 and extending through but spaced from the housing 14 by means of bushings 60 and 61.

The embodiments of FIGS. 3 and 4 provide control of thermal stress for the core structure 56 within the housing 14 by virtue of their construction as described. The fine structure in the respective configurations develops a controlled thermal gradient along the mount axis and has sufficient resilience to accommodate thermal growth as the core 56 heats.

There have thus been shown and described particular arrangements of mounting devices in accordance with the present invention which are particularly adapted for mounting a heat exchanger core within its housing for use in vehicle turbine applications. These devices are particularly adapted to control the severe thermal stresses encountered from the repetitive recycling of the associated turbine between power and idle conditions while at the same time absorbing the mechanical shock and vibration normally encountered in such use without undue strain upon the relatively thin, lightweight and fragile structure of the heat exchanger core.

Althouth such specific arrangements of heat exchanger mounting devices in accordance with the invention have been described for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A mount for supporting a heat exchanger core within a housing comprising:
    at least one layer of metallic hollow core structure means for floatably supporting said core within the housing;
    support means cooperative with said structure means;
    means for releasably attaching an outer end of said mount to the housing; and
    means affixing an inner end of said metallic hollow core structure against the core.

2. A mount in accordance with claim 1 wherein the structure means comprises a plurality of honeycomb layers interspersed between successive thin metal sheets in a sandwich configuration.

3. A mount in accordance with claim 2 wherein each successive honeycomb layer and an adjacent thin metal sheet have a lateral dimension less than that of the adjacent honeycomb layer and its adjacent thin metal sheet, proceeding outward from the inboard end of the mount.

4. A mount in accordance with claim 1 wherein said structure means comprises a single honeycomb metal layer.

5. A mount in accordance with claim 1 wherein the structure means comprises a plurality of layers of metal fins.

6. A mount in accordance with claim 2 wherein the inner end of the mount is fixedly attached to the core.

7. A mount for supporting a heat exchanger core within a housing, said mount comprising a plurality of honeycomb layers interspersed between successive thin metal sheets in a sandwich configuration, each successive honeycomb layer and an adjacent thin metal sheet having a lateral dimension less than that of the adjacent honeycomb layer and its adjacent thin metal sheet, proceeding outward from the inboard end of the mount, means for fixedly attaching an inner end of the mount to the core, and a bolt portion extending outwardly from the mount through an opening in the housing for attaching the mount to the housing.

8. A mount for supporting a heat exchanger core within a housing, said mount comprising a plurality of honeycomb layers of metal fins interspersed between successive thin metal sheets in a sandwich configuration, each successive honeycomb layer and an adjacent thin metal sheet having a lateral dimension less than that of the adjacent honeycomb layer and its adjacent thin metal sheet, proceeding outward from the inboard end of the mount, means for fixedly attaching an inner end of the mount to the core, and a bolt portion extending outwardly from the mount through an opening in the housing for attaching the mount to the housing.

9. A mount for supporting a heat exchanger core within a housing comprising:
 a plurality of layers of metal fins for floatably supporting a core within the housing;
 support means cooperative with said layers of metal fins;
 a bolt extending outwardly from said layers of metal fins through an opening in the housing and a pair of bushings encasing the bolt and bearing respectively against the inner and outer surfaces of the housing for releasably attaching an outer end of said mounting to the housing; and
 means affixing an inner end of the mount against the core.

10. A mount for supporting a heat exchanger core in a housing comprising:
 a plurality of honeycomb layers interspersed between successive metal sheets in a sandwich configuration, said thin metal sheets differing in thickness and decreasing in thickness according to their proximity to the heat exchanger core;
 support means cooperative with said honeycomb layers;
 means for releasably attaching an outer end of said mount to said housing; and
 means for affixing an inner end of said mount against the core.

* * * * *